(12) United States Patent
Takeda

(10) Patent No.: US 8,047,598 B2
(45) Date of Patent: Nov. 1, 2011

(54) AUTOMOTIVE INTERIOR MEMBER

(76) Inventor: Mitsumasa Takeda, Minoh (JP)

( * ) Notice: Subject to any disclaimer, the term of this patent is extended or adjusted under 35 U.S.C. 154(b) by 0 days.

(21) Appl. No.: 12/808,260

(22) PCT Filed: Dec. 2, 2008

(86) PCT No.: PCT/JP2008/071848
§ 371 (c)(1),
(2), (4) Date: Jul. 23, 2010

(87) PCT Pub. No.: WO2009/081695
PCT Pub. Date: Jul. 2, 2009

(65) Prior Publication Data
US 2010/0283283 A1    Nov. 11, 2010

(30) Foreign Application Priority Data
Dec. 21, 2007    (JP) ................. 2007-330610

(51) Int. Cl.
*B60J 3/00* (2006.01)
*B62D 25/14* (2006.01)
(52) U.S. Cl. ......... 296/97.2; 296/97.7; 296/70; 296/208
(58) Field of Classification Search ............... 296/97.2, 296/97.7, 70.208; 359/613, 614
See application file for complete search history.

(56) References Cited

U.S. PATENT DOCUMENTS

| | | | | |
|---|---|---|---|---|
| 3,549,469 | A * | 12/1970 | Wilfert | 296/70 |
| 4,756,603 | A * | 7/1988 | Ohtani | 359/601 |
| 5,316,359 | A * | 5/1994 | Lansinger | 296/70 |
| 6,601,902 | B1 * | 8/2003 | Rahmstorf et al. | 296/70 |
| 2006/0006685 | A1 | 1/2006 | Shibukawa et al. | |

FOREIGN PATENT DOCUMENTS

| | | |
|---|---|---|
| JP | 5-338434 | 12/1993 |
| JP | 6-57707 | 8/1994 |
| JP | 11-254945 | 9/1999 |
| JP | 2003-320870 | 11/2003 |
| JP | 2005-35390 | 2/2005 |
| JP | 2005-186385 | 7/2005 |
| JP | 2006-11177 | 1/2006 |
| JP | 2007-79452 | 3/2007 |

OTHER PUBLICATIONS

International Search Report issued Mar. 17, 2009 in corresponding International Application No. PCT/JP2008/071848.
International Preliminary Report on Patentability and Translation of Written Opinion of the International Searching Authority mailed Jul. 29, 2010 in corresponding International Application No. PCT/JP2008/071848.

* cited by examiner

*Primary Examiner* — Dennis Pedder
(74) *Attorney, Agent, or Firm* — Wenderoth, Lind & Ponack, L.L.P.

(57) ABSTRACT

The present invention relates to an automotive interior member placed on a part that receives sunlight (R) entering through a window (2) of an automobile (1). A corrugated sunlight-receiving surface (6) receives the sunlight (R). The corrugated sunlight-receiving surface (6) comprises a first slope (8), which receives the sunlight (R) entering through the window (2), and a second slope (9), which is disposed on a part where the sunlight (R) is blocked by the first slope (8), i.e., which faces the inside of an automotive compartment (1a). A cooling air passage (10) that extends along the underside of the sunlight-receiving surface (6) is provided in the interior member, and a blowing means (13) is provided in an air duct (12) that communicates with the cooling air passage (10).

20 Claims, 4 Drawing Sheets

AUTOMOTIVE INTERIOR MEMBER

BACKGROUND OF THE INVENTION

(1) Field of the Invention

The present invention relates to an automotive interior member placed on apart that receives sunlight entering through a window, for example, a dashboard or the like. In particular, the present invention relates to an automotive interior member that can control temperature rise in the interior member itself and its surroundings, that can reduce heat transfer to an occupant such as a driver or passenger, that can reduce load on an air conditioner, and that can reduce glare caused by reflection toward the inside of an automotive compartment, even when the automotive interior member receives sunlight entering through a window of an automobile.

(2) Description of Related Art

Generally, in an automobile such as a car, a truck, and a bus, when an interior member such as a dashboard receives sunlight entering through a window of an automobile, the temperature of the interior member becomes significantly higher than that of outside air. The temperature of the interior member becomes, for example, as high as 70° C. or more, when an on-board air conditioner is off. Especially, the temperature of a dashboard rises more easily since a dashboard, which is usually made of a dark-colored material to reduce glare toward a driver, easily absorbs radiant heat from sunlight. When the temperature of the interior member rises, the ambient temperature also rises and a lot of heat is transferred to a driver and others near the interior member. The radiant heat from sunlight reflected on a dashboard is also transferred to the driver. Therefore, especially when a driver starts to drive after parking, quick cooling of a driver's seat and its surroundings is required, and an air conditioner is forced to run with high load.

The load on an air conditioner caused by radiant heat from sunlight entering through a window is said to make up, for example, in summer, 40 to 50% of the total load on the air conditioner. As a result, the load on the air conditioner makes up 10 to 15% of the total energy consumption while an automobile is moving. Therefore, even when an interior member receives sunlight as mentioned above, efficient control of temperature rise in the interior member will provide a good driving environment, reduce load on an air conditioner, improve gas mileage by reducing fuel consumption for running an air conditioner, reduce emission of exhaust gas such as $CO_2$, and reduce harm on the environment.

In order to cool down a dashboard, a device that blows cold air through the inside of a dashboard (for example, see JP-U-06-057707, hereinafter referred to as conventional art 1) and a device that blows cold air over the upper surface of a dashboard (for example, see JP-A-05-338434, hereinafter referred to as conventional art 2) have been suggested.

In the conventional art 1, the inside of the upper part of a dashboard is hollowed. The hollowed space is provided with an inlet through which a part of cold air from an air conditioner is introduced and an outlet that connects the hollowed space to the outside of an automobile. The outlet is provided with a shutter.

In the conventional art 2, the device is provided with a cooling means and a blowing means, and the upper surface of a dashboard is provided with an air outlet. From the air outlet, the air cooled by the cooling means is blown over the upper surface of the dashboard with the blowing means.

BRIEF SUMMARY OF THE INVENTION

Technical Problem

In the conventional art 1 mentioned above, the inside of a dashboard is cooled by cooling air. A dashboard is usually made of a thick synthetic-resin material for the convenience of attachment of an automotive instrument and the like. When such a dashboard receives sunlight, a large amount of radiant heat is accumulated therein. Also, since such a synthetic-resin material does not have a high heat-transfer coefficient, when a driver starts to drive after the temperature in the automobile rises during parking, especially in summer or the like, it is not easy to quickly cool down the entire dashboard. Therefore, in addition to cold air that cools down the air in an automotive compartment, it is necessary to blow a large amount of cold air in the hollowed space mentioned above, which causes a problem that heavy load is added to an entire air conditioner.

In the conventional art 2 mentioned above, the surface of a dashboard is directly cooled by cooling air. Since a dashboard retains a large amount of heat as mentioned above, it is not easy to quickly reduce the temperature of the surface by simply blowing cooling air over the surface. In addition, due to an open space above the dashboard, the cooling air diffuses around the air outlet easily and quickly, which causes a problem that it is not easy to spread the cooling air over the entire surface of the dashboard.

A technical challenge of the present invention is to solve the problems mentioned above, and to provide an automotive interior member that can control temperature rise in the interior member itself and its surroundings, that can reduce heat transfer to an occupant such as a driver, that can reduce load on an air conditioner, and that can reduce glare caused by reflection toward the inside of an automotive compartment, even when the automotive interior member receives sunlight entering through a window of an automobile.

Solution to Problem

The present invention will be explained referring to FIG. 1 to FIG. 5, which shows embodiments of the present invention. The present invention is constituted as follows to solve the problems mentioned above.

That is, the present invention 1 relates to an automotive interior member placed on a part that receives sunlight (R) entering through a window (2) of an automobile (1), comprising a corrugated sunlight-receiving surface (6), which receives the sunlight (R), the corrugated sunlight-receiving surface (6) comprising a first slope (8) and a second slope (9), the first slope (8) receiving the sunlight (R) entering through the window (2), the second slope (9) being disposed on a part where the sunlight (R) is blocked by the first slope (8).

The present invention 2 relates to an automotive interior member placed on a part that receives sunlight (R) entering through a window (2) of an automobile (1), comprising a corrugated sunlight-receiving surface (6), which receives the sunlight (R), the corrugated sunlight-receiving surface (6) comprising a first slope (8) and a second slope (9), the first slope (8) receiving the sunlight (R) entering through the window (2), and the second slope (9) facing the inside of an automotive compartment (1a).

The first slope of the corrugated sunlight-receiving surface mentioned above receives sunlight entering through a window. In the present invention 1, the first slope blocks sunlight, and therefore sunlight does not fall upon the second slope. In the present invention 2, the second slope faces the inside of the automotive compartment and sunlight is blocked by the first slope, and therefore sunlight hardly falls upon the second slope. Since the sunlight-receiving surface is shaped into alternate first slopes and second slopes, temperature rise in the entire sunlight-receiving surface caused by radiation of sunlight is controlled. Furthermore, temperature rise in the atmosphere around the sunlight-receiving surface caused by contact with the first slopes is also controlled by contact with the second slopes, which have lower temperature.

The first slope faces the window side to receive sunlight entering through the window. On the other hand, the second slope faces the inside of the automotive compartment such as the driver's seat side to be in the shadow of the first slope, i.e., not to receive sunlight. Thus, most of sunlight entering through the window is reflected toward the window side, and reflection toward the inside of the automotive compartment is reduced. Therefore, the amount of radiation caused by the reflection of sunlight is reduced, and glare caused by the reflection toward the inside of the automotive compartment is also reduced. Preferably, the first slope especially is made of a dark-colored material to reduce a reflection such as a reflection of the first slope in a windshield.

The first slope is inclined to face the window side, and the inclination is not limited to a particular angle. However, when the first slope is near the vertical, sunlight entering at a particular angle will fall upon the second slope. On the other hand, when the first slope is near the horizontal, sunlight reflected on the first slope will easily fall upon an occupant such as a driver, and radiant heat to the driver will increase. The inclination of the first slope varies depending on the shape of a nearby window, the arrangement of seats, and the like; however, the inclination of the first slope to the horizontal extending from a ridge to the opposite side of a passenger is preferably 90 degrees or less, and large enough not to allow reflection of sunlight horizontally entering to fall upon the passenger. Specifically, the inclination is more preferably about 20 to 40 degrees.

In the present invention 1, the second slope mentioned above is disposed on apart where the first slope blocks sunlight. In the present invention 2, the second slope faces the inside of the automotive compartment. In either invention, the inclination is not limited to a particular angle. However, when the inclination of the second slope to the horizontal extending from a ridge to the passenger side is small, sunlight will easily fall upon the second slope. On the other hand, when the inclination of the second slope to the horizontal extending from a ridge to the passenger side is too large, pitch between each ridge or groove is too small, which gives a disadvantage such as a high production cost. The inclination of the second slope varies depending on the shape of a nearby window, the inclination of the first slope, and the like; however, the inclination of the second slope to the horizontal extending from a ridge to the passenger side is more preferably about 110 to 130 degrees. In this case, the second slope hardly receives sunlight, and therefore temperature rise in the entire sunlight-receiving surface can be definitely controlled and also temperature rise in the atmosphere around the sunlight-receiving surface can be further controlled. In addition, pitch between each ridge or groove is not too small, and therefore the present invention can be applied at a low cost.

The interior member mentioned above has a corrugated sunlight-receiving surface. The corrugated sunlight-receiving surface may be formed on the upper surface of the interior member. Alternatively, the corrugated sunlight-receiving surface may be formed on the upper surface of a sunlight-receiving plate placed on top of the main part of the interior member.

In cases where the corrugated sunlight-receiving surface is formed on the main part of the interior member, the surface and the main part can be integrally made. The integrally-made interior member has an advantage of being applied at a low cost. In cases where the sunlight-receiving plate mentioned above is used, the sunlight-receiving plate has advantages of being easily applied to an existing automotive interior member, of preventing temperature rise in the main part of the interior member since the sunlight-receiving plate blocks sunlight, and of reducing accumulation of radiant heat from sunlight since the sunlight-receiving plate can be made thin. Moreover, in cases where a cooling air passage is provided as mentioned below and the sunlight-receiving plate is made thin, there is an advantage of quickly reducing the temperature of the entire sunlight-receiving plate itself with cooling air. The sunlight-receiving plate can be made of any material such as a synthetic-resin material, pasteboard, a metallic material, and a composite material thereof.

By heat exchange between the sunlight-receiving surface and the atmosphere inside the automotive compartment, temperature rise in the sunlight-receiving surface mentioned above is controlled, or the sunlight-receiving surface is cooled down. It is preferable that a cooling air passage that extends along the underside of the corrugated sunlight-receiving surface be provided in the interior member, that the cooling air passage communicate with an air duct, and that a blowing means be provided in the air duct. This is because cooling air such as outside air can be blown into the cooling air passage with the blowing means to effectively cool down the sunlight-receiving surface.

In cases where the sunlight-receiving plate mentioned above is used, the cooling air passage may be provided inside the sunlight-receiving plate. Alternatively, the cooling air passage may be provided between the main part of the interior member and the sunlight-receiving plate, and the blowing means may be provided in the air duct that communicates with the cooling air passage. This embodiment is preferable since the structure of the sunlight-receiving plate is simple, and therefore the present invention can be applied at a low cost.

The inner surface of the cooling air passage is not limited to a particular shape. For example, the inner surface of the cooling air passage may be smooth to reduce airflow resistance, thereby letting cooling air efficiently pass through. It is more preferable that at least the sunlight-receiving-surface side of the inner surface of the cooling air passage be corrugated to fit to the sunlight-receiving surface. This embodiment provides a larger contact area between the cooling air and the sunlight-receiving-surface side of the inner surface of the cooling air passage, which achieves efficient exchange of heat and quick cooling of the sunlight-receiving surface.

To the cooling air passage, cooling air may be supplied from an on-board air conditioner. In this case, the sunlight-receiving surface can be cooled down intensively and quickly. Also, since the sunlight-receiving surface is warmed up to a higher temperature than the outside temperature when receiving sunlight, the interior member can be sufficiently cooled down only by supplying air outside the automobile to the cooling air passage with the blowing means. In this case, an on-board air conditioner does not have to cool down the interior member, and the air conditioner is free from the corresponding load. Therefore, fuel consumption can be further reduced and gas mileage can be further improved. Also, the blowing means may supply air inside the automobile to the cooling air passage. This embodiment has an additional advantage of exhausting warmed-up air from the inside of the automobile to the outside.

As the blowing means, a fan or the like is usually used. However, the fan may be omitted when the blowing means comprises an opening that faces the traveling direction of an automobile and a shutter that opens and closes the opening, in order for air outside the automobile to be introduced while the automobile is moving. Alternatively, the fan may be omitted when the blowing means comprises an opening that faces a different direction from the traveling direction of an automobile and a shutter that opens and closes the opening, in order for air inside an automobile to be drawn out of the automobile while the automobile is moving.

Advantageous Effect of Invention

The present invention has the constitution and functions as mentioned above, and thus exerts the following effects.

(1) The corrugated sunlight-receiving surface of the automotive interior member is shaped into alternate first slopes and second slopes, the first slopes receiving sunlight, and the second slopes not receiving sunlight; therefore, even when the sunlight-receiving surface receives sunlight entering through a window, the sunlight-receiving surface can control temperature rise in the entire sunlight-receiving surface itself caused by radiation from the sunlight. Temperature rise in the atmosphere around the sunlight-receiving surface can also be controlled by contact with the second slopes, which have lower temperature.

(2) The first slopes face the window side and the second slopes, where sunlight is blocked by the first slopes, face the inside of the automotive compartment, and thus most of sunlight entering through a window can be reflected toward the window side; therefore, the amount of radiation caused by reflection of sunlight toward the inside of the automotive compartment can be reduced, heat transfer to a driver and others can be reduced, and glare caused by the reflection toward the inside of the automotive compartment can be reduced.

(3) Temperature rise in the sunlight-receiving surface and the atmosphere around the sunlight-receiving surface can be controlled, the amount of radiation toward the inside of the automotive compartment caused by sunlight reflected on the sunlight-receiving surface is reduced, and heat transfer to a driver and others can be reduced. These can reduce load on an air conditioner, can improve gas mileage by reducing fuel consumption for running the air conditioner, can reduce emission of exhaust gas such as $CO_2$, and can reduce harm on the environment.

REFERENCE SIGNS LIST

Figure 1:
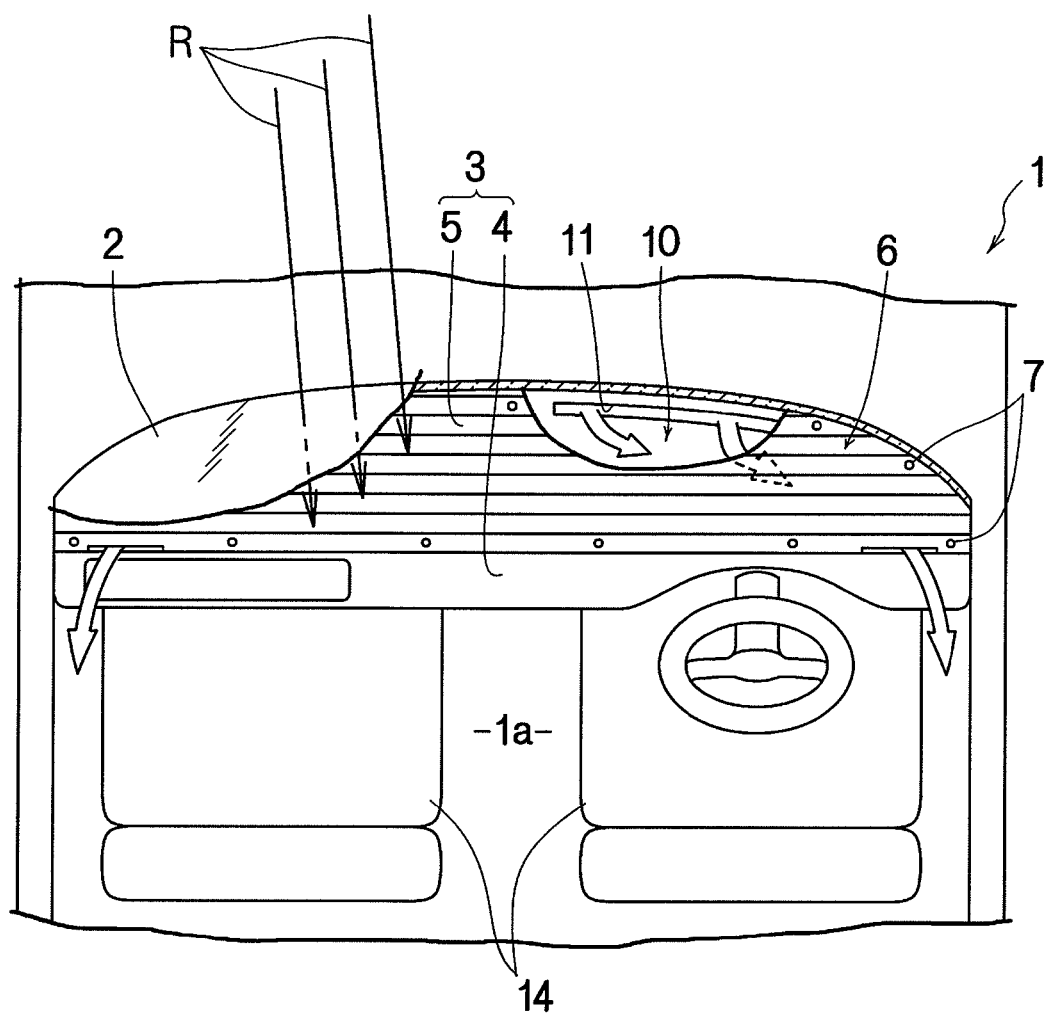
FIG. 1 is a plan view around a dashboard of an automobile showing an embodiment of the present invention.

1. Automobile
1a. Automotive compartment
2. Window (windshield)
3. Interior member (dashboard)
4. Main part
5. Sunlight-receiving plate
6. Sunlight-receiving surface
8. First slope
9. Second slope
10. Cooling air passage
12. Air duct
13. Blowing means (blower)
C. Passenger
R. Sunlight
α. Inclination angle of a first slope (8)
β. Inclination angle of a second slope (9)

DETAILED DESCRIPTION OF THE INVENTION

Hereinafter, embodiments of the present invention will be described based on the drawings.

Figure 2:
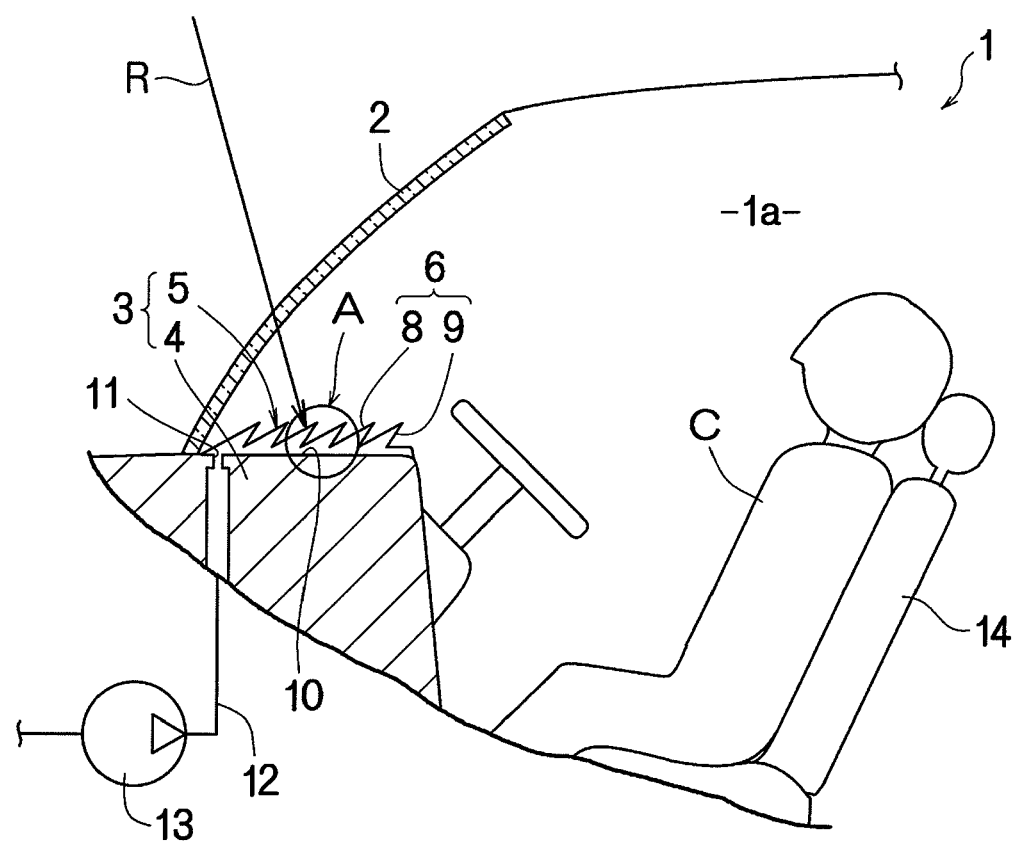
FIG. 2 is a vertical sectional view of a dashboard showing an embodiment of the present invention.
Figure 3:
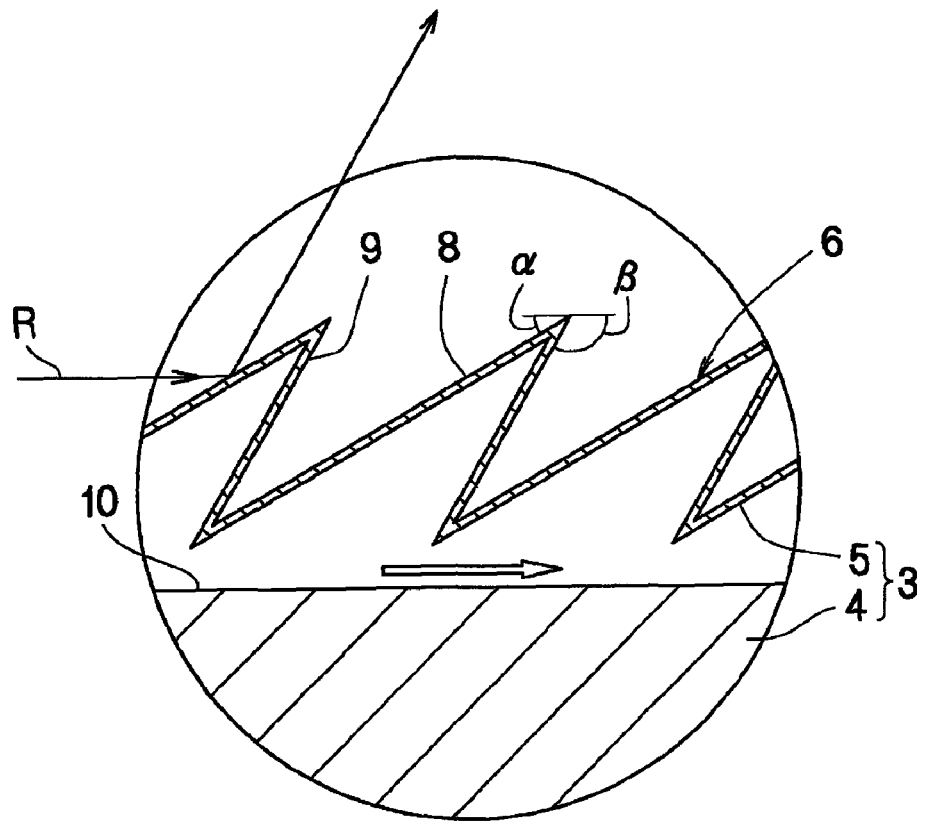
FIG. 3 is an enlarged view of A in FIG. 2.

FIG. 1 to FIG. 3 show embodiments of the present invention. FIG. 1 is a plan view around a dashboard of an automobile. FIG. 2 is a vertical sectional view of a dashboard. FIG. 3 is an enlarged view of A in FIG. 2.

As shown in FIG. 1, a dashboard (3) near a windshield (2) of an automobile (1) receives sunlight (R) entering through the windshield (2), when the height and direction of the sun are in a particular range.

As shown in FIG. 2, the dashboard (3) comprises a main part (4) and a sunlight-receiving plate (5) placed on top of the main part (4). The sunlight-receiving plate (5) is made of, for example, a piece of corrugated dark-colored pasteboard, i.e., the upper surface of the sunlight-receiving plate (5) has a corrugated sunlight-receiving surface (6). In this embodiment, the sunlight-receiving plate (5) is made of pasteboard, but the sunlight-receiving plate in the present invention can be made of any material such as a synthetic-resin material, a metallic material, and a composite material thereof.

The sunlight-receiving plate (5) is fixed on the main part (4) with a fixing means (7) such as a screw in order not to easily slide on the surface of the main part (4). In cases where the sunlight-receiving plate (5) of the present invention does not easily slide on the surface of the main body (4) due to its own weight or the like, the sunlight-receiving plate (5) may be simply put on the main part (4) without the fixing means. The fixing means (7) may be a locking part, a sucker, a magnet, or the like, which can fix the sunlight-receiving plate (5) on the main part (4) and also can release the plate therefrom. Alternatively, the fixing means (7) may be an adhesive or the like, which can fix the sunlight-receiving plate (5) on the main part (4) but cannot release the plate therefrom.

As shown in FIG. 2 and FIG. 3, the sunlight-receiving surface (6) mentioned above comprises a first slope (8), which receives sunlight (R) entering through the windshield (2), and a second slope (9), which is disposed on a part where sunlight (R) is blocked by the first slope (8), i.e., on a part where the shadow of the first slope falls. In particular, the first slope (8) faces the windshield (2), and the second slope (9) faces the inside of an automotive compartment (1a). The inclination angle (α) of the first slope (8) to the horizontal extending from a ridge to the opposite side of a passenger, i.e., to the windshield (2) side, is about 30 degrees for example. The inclination angle (β) of the second slope (9) to the horizontal extending from a ridge to the passenger side, i.e., to the inside of the automotive compartment (1a), is about 120 degrees. Thus, even when sunlight (R) enters horizontally from the front of the automobile (1), the sunlight is reflected on the first slope (8) and cannot reach to an occupant (C) such as a driver. In addition, even when sunlight (R) enters from the above, the sunlight does not fall upon the second slope (9).

The corrugation on the sunlight-receiving plate (5) mentioned above is in the shape of a triangle wave having, for example, about 22 mm in height, and about 25 mm in pitch between each ridge or groove. The shape and size of the corrugation in the present invention are not limited to those of this embodiment. The corrugation may be in other shapes, and the size may be smaller or larger than that of this embodiment. In this embodiment, the inclination angle (α) of every first slope (8) is about the same throughout the sunlight-receiving surface (6); the same is true for the inclination angle (β) of every second slope (9). Alternatively, each of these angles may vary; for example, the inclination angle (α) of the first slope (8) may become larger and the inclination angle (β) of the second slope (9) may become smaller, as the slopes are closer to a driver's seat.

The first slope (8) on the sunlight-receiving plate (5) mentioned above is warmed up when receiving sunlight (R). On the other hand, temperature rise in the second slope (9) is controlled since the second slope (9) does not receive sunlight (R). Therefore, temperature rise in the entire sunlight-receiving plate (5) and a nearby atmosphere is controlled, and heat transfer from the dashboard (3) to the nearby passenger (C) is reduced. The passenger (C) can mainly see the second slope (9), which is in the shadow of the first slope, and cannot see the first slope (8). Even when the passenger can see the first slope (8), reflection of sunlight (R) cannot reach to the passenger (C). Therefore, the passenger (C) hardly receives radiant heat caused by reflection of sunlight (R). Also, glare caused by sunlight (R) reflected on the dashboard (3) is prevented.

As shown in FIG. 2 and FIG. 3, a cooling air passage (10) that extends along the underside of the corrugated sunlight-receiving surface (6) mentioned above is formed between the main part (4) and the sunlight-receiving plate (5) in the dashboard (3). The thickness of the sunlight-receiving plate (5) is almost uniform. In other words, the sunlight-receiving-surface (6) side of the inner surface of the cooling air passage (10) is corrugated to fit to the sunlight-receiving surface (6). An air outlet (11) for preventing condensation, which opens to the cooling air passage (10) at the upper surface of the main part (4), is provided in the main part (4). The air outlet (11) communicates with the outside of the automobile via an air duct (12), and the air duct (12) is provided with a blower (13). When the blower (13) is run, air outside the automobile is supplied to the cooling air passage (10), and the air outside the automobile blown through the cooling air passage (10) quickly cools down the sunlight-receiving plate (5), which is warmed up by sunlight (R).

The air that goes through the cooling air passage (10) is exhausted into a space other than a seat (14) such as a driver's seat in the automotive compartment (1a) as shown in FIG. 1. In this embodiment, the exhaust air from the cooling air passage (10) is exhausted to the inside of the automotive compartment (1a). Alternatively, in the present invention, an air duct may be provided downstream of the air path and the exhaust air may be exhausted to the outside of the automobile. In this case, such a downstream air duct can be additionally provided with the blower (13), and the blower (13) can draw outside air to the cooling air passage (10).

The surface temperature of the sunlight-receiving plate mentioned above when receiving sunlight was measured, and the temperature was compared to that of a conventional dashboard that does not have a sunlight-receiving plate.

Example 1

An automobile (1) was parked with the car-door windows closed at the outside temperature of 26° C. in fine weather, and 30 minutes later, the temperature mentioned below was measured. The temperature in the automotive compartment (1a) was 41° C. At that time, the temperature of the first slope (8) on the sunlight-receiving plate (5) went up to 71° C., and the temperature of the second slope (9) went up to 62° C. On the other hand, the temperature of the conventional dashboard went up to 72° C.

Next, the inside of the automotive compartment (1a) was ventilated by the automobile moving with the car-door windows opened, and 10 minutes later the temperature mentioned below was measured. The temperature in the automotive compartment (1a) was reduced to 38° C. At that time, the temperature of the first slope (8) was 61° C., reduced by 10° C. The temperature of the second slope (9) was 56° C. On the other hand, the temperature of the conventional dashboard was 66° C., reduced by 6° C.

Just after this measurement, outside air of 26° C. was blown into the cooling air passage (10), and 10 minutes later the surface temperature was measured. The temperature of the first slope (8) was reduced to 47° C., and the temperature of the second slope was reduced to 41° C.

The results of the measurements mentioned above showed that the dashboard (3) provided with the corrugated sunlight-receiving surface (6) can more effectively control temperature rise in the surface than the conventional dashboard even when receiving sunlight, and that the surface temperature can be quickly reduced only by blowing outside air into the cooling air passage.

Example 2

Illuminance from sunlight reflected on the dashboard, when the dashboard receives sunlight in fine weather, was measured at the driver's seat in order to determine the amount of reflected sunlight to the driver's seat. The illuminance from sunlight reflected on the second slope (9) on the sunlight-receiving plate (5), which is mainly seen from the driver's seat side, was about 2200 lux. On the other hand, the illuminance from sunlight reflected on the conventional dashboard was about 3600 lux.

Next, an automobile (1) was parked with the car-door windows opened about 10 cm, and outside air was blown into the cooling air passage (10) at the outside temperature of 28° C. in fine weather. In this condition, the surface temperature of the sunlight-receiving plate and the temperature at the driver's seat, which receives radiation from the sunlight-receiving plate, were measured. The temperature in the automotive compartment was 40° C. The surface temperature of the first slope on the sunlight-receiving plate was 45° C. The temperature at the driver's seat was 47° C. On the other hand, in an automobile equipped with the conventional dashboard, the temperature in the automotive compartment was 40° C., the surface temperature of the dashboard was 70° C., and the temperature at the driver's seat was 51° C. The temperature at the driver's seat mentioned above refers to the temperature measured on a surface of a piece of black pasteboard placed almost vertically on a driver's seat at the position of a driver.

The results of the measurements mentioned above showed that the dashboard (3) provided with the corrugated sunlight-receiving surface (6) can more effectively reduce transfer of radiant heat and glare toward the driver's seat even when the dashboard receives sunlight, compared to the conventional dashboard.

The automotive interior members of the embodiments mentioned above are illustrative purpose of embodying the technical concept of the present invention. The structure, the arrangement, and the like of each part are not limited to those of the embodiments, and can be modified in various ways within the scope of the claims of the present invention.

For example, according to the embodiment mentioned above, the automotive interior member comprises the main part and the sunlight-receiving plate thereon, and the upper surface of the sunlight-receiving plate has the sunlight-receiving surface. Alternatively, in the present invention, the upper surface of the interior member and the sunlight-receiving surface may be integrally made.

Figure 4:
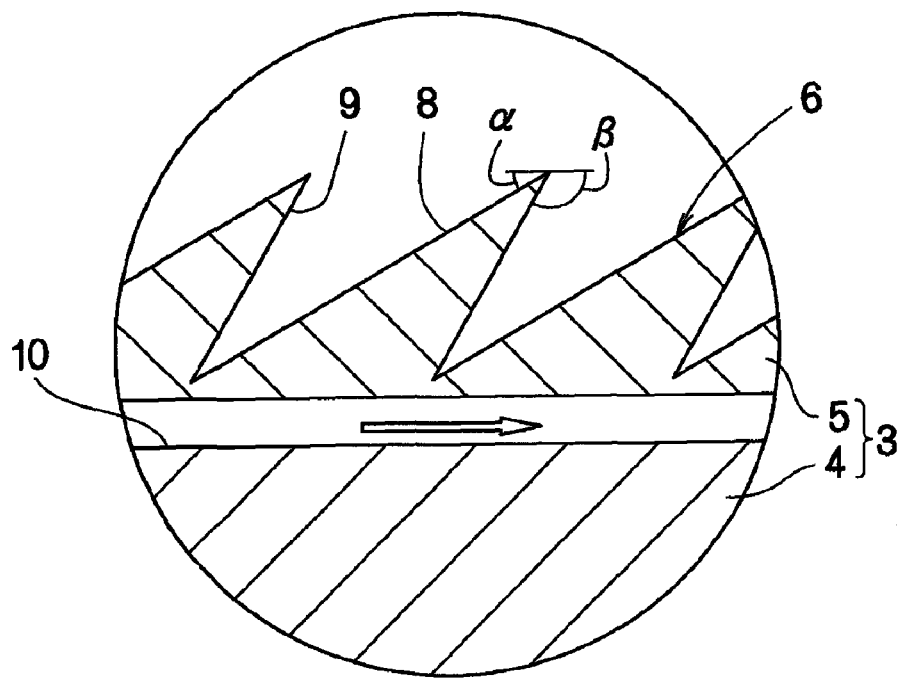
FIG. 4 is a view of Modification 1 corresponding to FIG. 3.

The embodiment mentioned above explained a case where the sunlight-receiving-surface (6) side of the inner surface of the cooling air passage (10) is corrugated to fit to the sunlight-receiving surface (6). Alternatively, in the present invention, both upper and lower sides of the inner surface of the cooling air passage may be corrugated. Alternatively, for example, as shown in Modification 1 in FIG. 4, the inner surface of the cooling air passage (10) may be smooth. In this case, airflow resistance of the cooling air passage (10) is small, and therefore this modification has an advantage of easily blowing cooling air through the cooling air passage (10).

According to the embodiment mentioned above, air outside an automobile is introduced into the cooling air passage with the use of the air outlet for preventing condensation. In the present invention, a dedicated air duct through which air outside an automobile is introduced into the cooling air passage may be provided inside of the interior member. Alternatively, cold air from an on-board air conditioner may be introduced into the cooling air passage.

Figure 5:
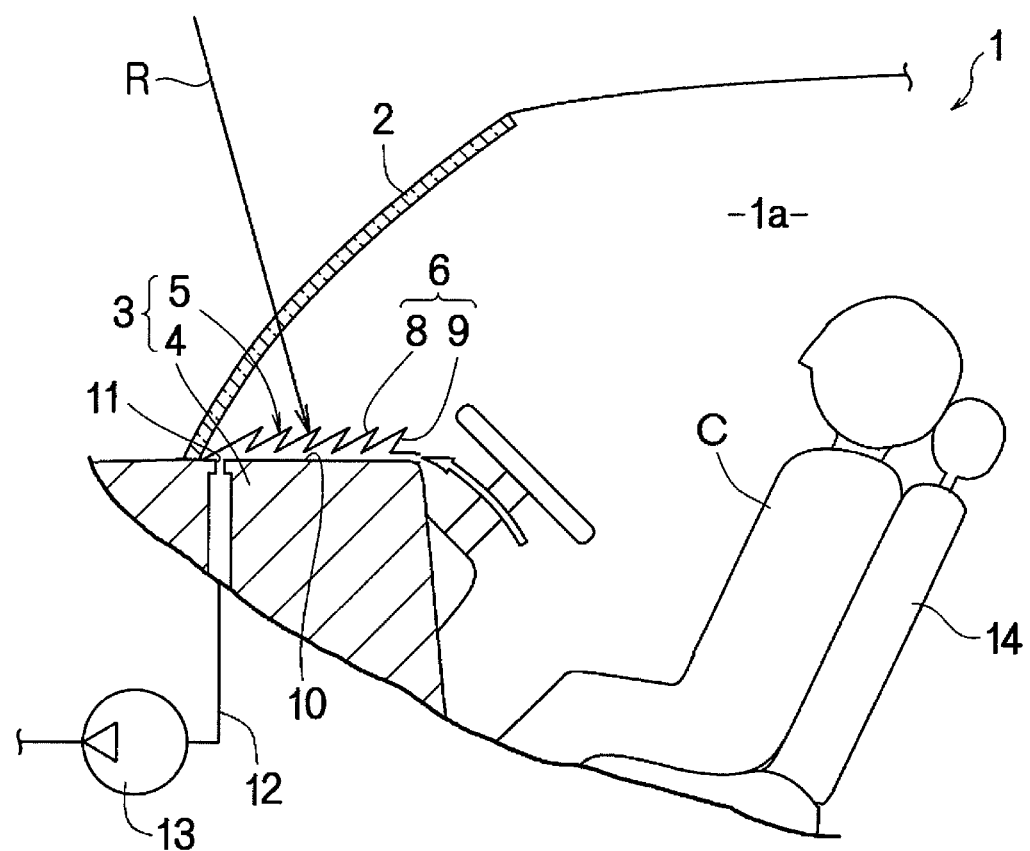
FIG. 5 is a view of Modification 2 corresponding to FIG. 2.

Furthermore, for example, as shown in Modification 2 in FIG. 5, the cooling air passage (10) may communicates with the inside of the automotive compartment (1a), and the blower (13) provided in the air duct (12) may draw air from the inside of the automobile to the cooling air passage (10). In the embodiments mentioned above and Modification 2, the blower (13) may be omitted when the blowing means comprises an opening that is at the end of the air duct (12) and faces the traveling direction of the automobile or a different direction therefrom, and a shutter that opens and closes the opening.

In the embodiments mentioned above, an air path can be easily disposed since exhaust air from the cooling air passage is exhausted into a space other than the driver's seat inside the automotive compartment. Alternatively, in the present invention, an air duct may be provided downstream of the air path in order to exhaust air from the cooling air passage to the outside of the automobile. This embodiment is preferable since the automotive interior member can effectively reduce the ambient temperature in the entire automotive compartment.

The embodiments mentioned above explained a case where the interior member mentioned above is a dashboard. The automotive interior member of the present invention may be any interior member placed on a part that receives sunlight. It is needless to say that the automotive interior member of the present invention may be any interior member besides a dashboard, for example, a rear parcel shelf and the like.

INDUSTRIAL APPLICABILITY

The automotive interior member of the present invention can control temperature rise in the interior member and its surroundings, can reduce heat transfer to a passenger such as a driver, can reduce load on an air conditioner, and can reduce glare caused by reflection toward the inside of an automotive compartment, even when the automotive interior member receives sunlight entering through a window of an automobile. Therefore, the automotive interior member of the present invention is suitable for an interior member of various automobiles such as cars, trucks, buses.

The invention claimed is:

1. An automotive interior member for being placed on a part that receives sunlight entering through a window of an automobile, said automotive interior member comprising:
   a corrugated sunlight-receiving surface which receives sunlight and includes a ridge, a first slope, and a second slope,
   wherein the first slope extends to one side of the ridge and faces the window and the second slope extends to another side of the ridge and faces away from the window,
   wherein the first slope receives the sunlight entering through the window, and the second slope is arranged at a position where the sunlight is blocked by the first slope, and
   wherein an inclination angle of the second slope from a horizontal plane at the ridge to a passenger side of the second slope is about 110 to 130 degrees.

2. The automotive interior member according to claim 1, further comprising:
   a main part; and
   a sunlight-receiving plate placed on top of the main part,
   wherein the corrugated sunlight-receiving surface is an upper surface of the sunlight-receiving plate.

3. The automotive interior member according to claim 1, further comprising:
   a cooling air passage that extends along an underside of the corrugated sunlight-receiving surface; and
   a blower provided in an air duct that communicates with the cooling air passage.

4. The automotive interior member according to claim 3, further comprising:
   a main part; and
   a sunlight-receiving plate placed on top of the main part,
   wherein the corrugated sunlight-receiving surface is an upper surface of the sunlight-receiving plate, and
   wherein the cooling air passage is provided between the main part and the sunlight-receiving plate.

5. The automotive interior member according to claim 3, wherein an inner surface of the cooling air passage is smooth.

6. The automotive interior member according to claim 3, wherein at least an upper inner surface of the cooling air passage is corrugated to fit to the sunlight-receiving surface.

7. The automotive interior member according to claim 3, wherein the blower can supply air from outside the automobile to the cooling air passage.

8. The automotive interior member according to claim 3, wherein the blower can supply air from inside the automobile to the cooling air passage.

9. The automotive interior member according to claim 1, wherein the first slope facing the window is inclined, and the inclination angle thereof is large enough not to allow reflection of sunlight horizontally entering to fall upon a passenger.

10. The automotive interior member according to claim 1, wherein the passenger side of the second slope faces into an automotive compartment.

11. An automotive interior member for being placed on a part that receives sunlight entering through a window of an automobile, said automotive interior member comprising:
    a main part of an automobile dashboard;
    a sunlight-receiving plate disposed on top of the main part, the sunlight-receiving plate having a corrugated sunlight-receiving surface which receives sunlight; and
    a cooling passage extending under the corrugated sunlight-receiving surface, wherein the corrugated sunlight-receiving surface has a plurality of first slopes, a plurality of second slopes, and a plurality of ridges, wherein each first slope of the corrugated sunlight-receiving surface extends to one side of a respective one of the ridges and faces the window, wherein each second slope of the corrugated sunlight-receiving surface extends to another side of a respective one of the ridges and faces away from the window, wherein an inclination angle of each second slope from a horizontal plane at the respective ridge to a passenger side of the second slope is about 110 to 130 degrees.

12. The automotive interior member according to claim 11, wherein an inclination angle of each first slope from a horizontal plane at the ridge to a window side of the first slope is about 30 degrees.

13. The automotive interior member according to claim 11, further comprising a blower provided in an air duct that communicates with the cooling air passage.

14. The automotive interior member according to claim 11, further comprising:
an air duct provided in the main part and communicating with the cooling air passage;
a blower connected to the air duct for driving cooling air through the cooling air passage.

15. The automotive interior member according to claim 11, wherein an inner surface of the cooling air passage is smooth.

16. The automotive interior member according to claim 11, wherein at least an upper inner surface of the cooling air passage is corrugated to fit to the sunlight-receiving surface.

17. The automotive interior member according to claim 13, wherein the blower can supply air from outside the automobile to the cooling air passage.

18. The automotive interior member according to claim 13, wherein the blower can supply air from inside the automobile to the cooling air passage.

19. The automotive interior member according to claim 11, wherein each first slope is inclined, and the inclination angle thereof is large enough not to allow reflection of sunlight horizontally entering to fall upon a passenger.

20. The automotive interior member according to claim 11, wherein the passenger side of the second slope faces into the automotive compartment.

* * * * *